(12) United States Patent
    Ulichney et al.

(10) Patent No.: US 10,791,239 B2
(45) Date of Patent: Sep. 29, 2020

(54) ENCODING INFORMATION IN PRINTED IMAGES BY DECREASING GRAYSCALE PIXEL VALUES EXCEEDING THRESHOLD

(71) Applicant: HEWLETT-PACKARD DEVELOPMENT COMPANY, L.P., Spring, TX (US)

(72) Inventors: Robert Ulichney, Stow, MA (US); Matthew D. Gaubatz, Seattle, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,600

(22) PCT Filed: Jun. 15, 2018

(86) PCT No.: PCT/US2018/037745
    § 371 (c)(1),
    (2) Date: Oct. 16, 2019

(87) PCT Pub. No.: WO2019/182628
    PCT Pub. Date: Sep. 26, 2019

(65) Prior Publication Data
    US 2020/0134404 A1    Apr. 30, 2020

(51) Int. Cl.
    *H04N 1/32*      (2006.01)
    *G06K 15/02*     (2006.01)
    *H04N 1/40*      (2006.01)
    *H04N 1/405*     (2006.01)
    *H04N 1/60*      (2006.01)

(52) U.S. Cl.
    CPC ...... *H04N 1/32219* (2013.01); *G06K 15/1881* (2013.01); *G06K 15/1892* (2013.01); *H04N 1/32208* (2013.01); *H04N 1/32251* (2013.01); *H04N 1/32256* (2013.01); *H04N 1/4055* (2013.01); *H04N 1/40062* (2013.01); *H04N 1/60* (2013.01)

(58) Field of Classification Search
    CPC ........... H04N 1/32144; H04N 1/32208; H04N 1/32219; H04N 1/32251; H04N 1/32256; H04N 1/40062; H04N 1/405; H04N 1/4055; H04N 1/407; G06K 15/1881; G06K 15/1892
    See application file for complete search history.

(56) References Cited

U.S. PATENT DOCUMENTS

| | | |
|---|---|---|
| 5,323,245 A | 6/1994 | Rylander |
| 5,946,414 A | 8/1999 | Cass et al. |

(Continued)

*Primary Examiner* — Scott A Rogers
(74) *Attorney, Agent, or Firm* — International IP Law Group PLLC

(57) ABSTRACT

In an example method, a dot pattern of pixels including information to be encoded across an image is mapped to a corresponding subset of the grayscale source pixels corresponding to the image to be printed. A value of a grayscale pixel in the subset of the grayscale source pixels is modified based on based on a predetermined threshold pixel value. The value of the grayscale pixel is decreased in response to detecting that the predetermined threshold pixel value is exceeded. The clipping channel color is used to detect the dot pattern of pixels. The image including the subset of pixels with modified values is printed.

15 Claims, 11 Drawing Sheets

(56) References Cited

U.S. PATENT DOCUMENTS

| | | | |
|---|---|---|---|
| 6,738,491 B1 * | 5/2004 | Ikenoue | G06T 1/0021 |
| | | | 283/901 |
| 7,027,189 B2 | 4/2006 | Umeda | |
| 7,028,902 B2 | 4/2006 | Xu et al. | |
| 7,149,451 B2 | 12/2006 | Uchida et al. | |
| 7,234,645 B2 | 6/2007 | Silverbrook et al. | |
| 7,385,730 B2 | 6/2008 | Ogasahara et al. | |
| 7,609,851 B2 | 10/2009 | Guan et al. | |
| 7,783,073 B2 | 8/2010 | Asano | |
| 7,864,979 B2 | 1/2011 | Fan et al. | |
| 7,911,653 B2 | 3/2011 | Saito | |
| RE42,473 E | 6/2011 | Gorian et al. | |
| 8,014,035 B2 | 9/2011 | Monga et al. | |
| 8,189,235 B2 | 5/2012 | Matsuzaki | |
| 8,335,014 B2 | 12/2012 | Muramatsu | |
| 8,599,457 B2 | 12/2013 | Iwamoto | |
| 9,344,600 B2 | 5/2016 | Chen et al. | |
| 2004/0148261 A1 | 7/2004 | Abe | |
| 2005/0259280 A1 | 11/2005 | Rozzi | |
| 2006/0072781 A1 | 4/2006 | Harrington | |
| 2008/0080009 A1 | 4/2008 | Masui et al. | |
| 2008/0292129 A1 | 11/2008 | Fan et al. | |
| 2010/0040282 A1 | 2/2010 | Bala et al. | |
| 2011/0102847 A1 | 5/2011 | Wang et al. | |
| 2013/0063568 A1 | 3/2013 | Silverbrook | |
| 2015/0371124 A1 | 12/2015 | Okumura | |
| 2016/0364825 A1 | 12/2016 | Pan | |

* cited by examiner

300

400A

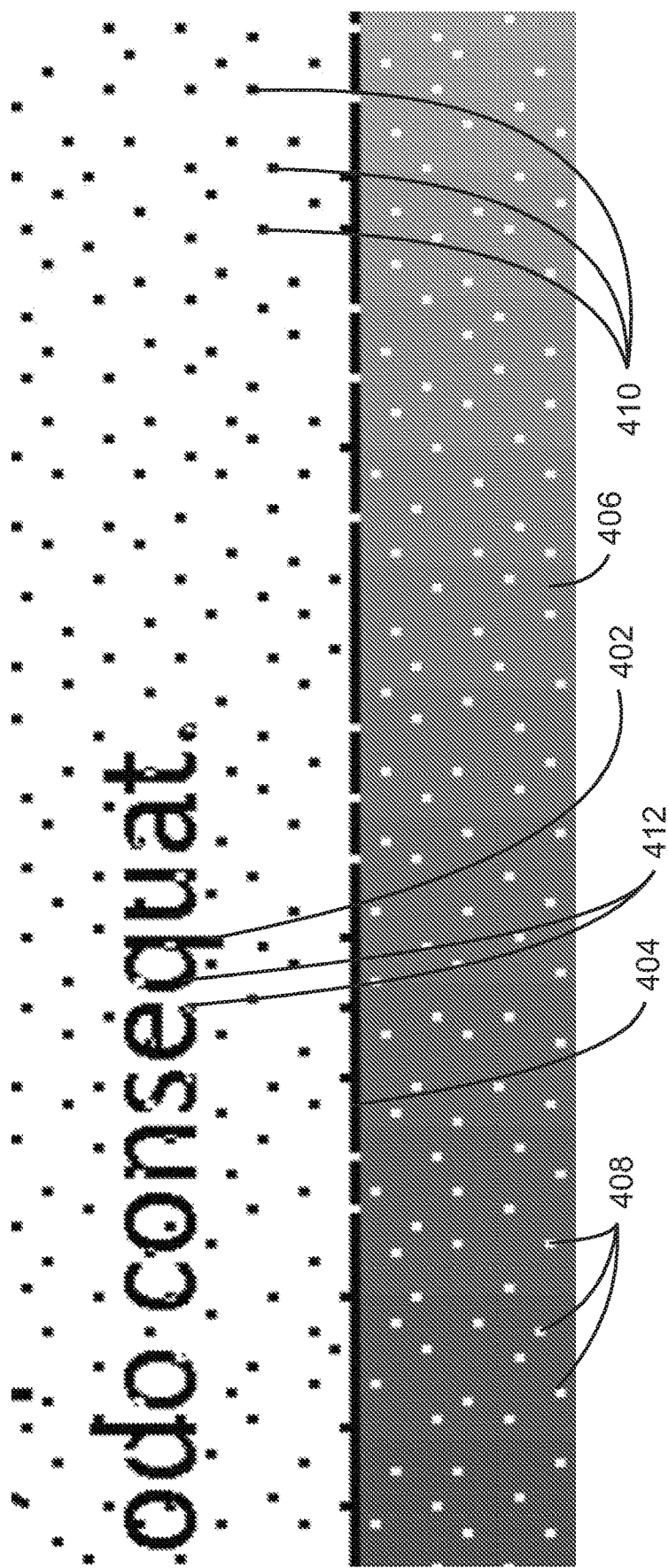

400C

600

ENCODING INFORMATION IN PRINTED IMAGES BY DECREASING GRAYSCALE PIXEL VALUES EXCEEDING THRESHOLD

BACKGROUND

Information may be encoded into printed images. For example, the information about when and where the document was printed, and who printed the document.

BRIEF DESCRIPTION OF THE DRAWINGS

Various features of the techniques of the present application will become apparent from the following description of examples, given by way of example only, which is made with reference to the accompanying drawings, of which:

FIG. 4B is an example portion of the same grayscale image with a dot pattern encoded using a 70% source pixel intensity threshold;

DETAILED DESCRIPTION

Dot patterns may be used to encode information into printed documents. For example, dot patterns may be used to encode information on documents with minimal visual distraction. As used herein, a dot patter refers to a pattern in which a relative position of dots is used to encode information. For example, one or more of the dots of a dot pattern of black dots may be shifted from an original uniform pattern and printed on a sheet of paper to indicate the time, date, and serial number of the printer, among other information. The encoded dot patterns may then be detected to retrieve the encoded information. While black dots can be recovered when printed on a white background, the black dot may not be detectable and thus recoverable when printed on backgrounds of black or darker grays. For example, documents having lots of darker shades of black or at all may result in a substantial portion of encoded information being undetectable. Moreover, the dot patterns may be visually distracting when incorporated into some images.

Described herein are techniques for encoding dot patterns into printed grayscale documents based on source pixel intensity. A digital document can be described as an image, since it is comprised of an array of pixels. An image, as used herein, includes any combination of text, graphics, white, space, and photos. In one example, the intensity of each of the dots in the dot pattern as printed out in a grayscale image is based on an original intensity of the source page pixel being replaced. For example, the pixels corresponding to the dots may be clipped. Grayscale clipping as used herein refers to the setting of a pixel value to a maximum representing white or a zero representing black or some other solid ink color, such as magenta, yellow, cyan, etc. In some examples, suitable replacement intensity values are included in a lookup table to be used to replace source page pixels. The techniques described herein also provide a flexible means for defining dot intensity and background intensity combinations. For example, the lookup table can be used to set specific intensity values to pass without being modified. Thus, pixels corresponding to black areas of text or line drawings may be bypassed to improve readability of the text and the appearance of the line drawings. The techniques described herein enable dot detectability for the entire document while minimizing visibility and intrusiveness of the dots in the pattern. Moreover, the techniques described herein may use existing printing processes and inks to encode a dot pattern that may be recovered regardless of the content on the page. For example, the page content may be empty white space, text, solid areas of color, or even more complex graphic patterns with various shades of a color. In some examples, the dot pattern may be used to deter copying and trace an origin of copied documents.

Figure 1:
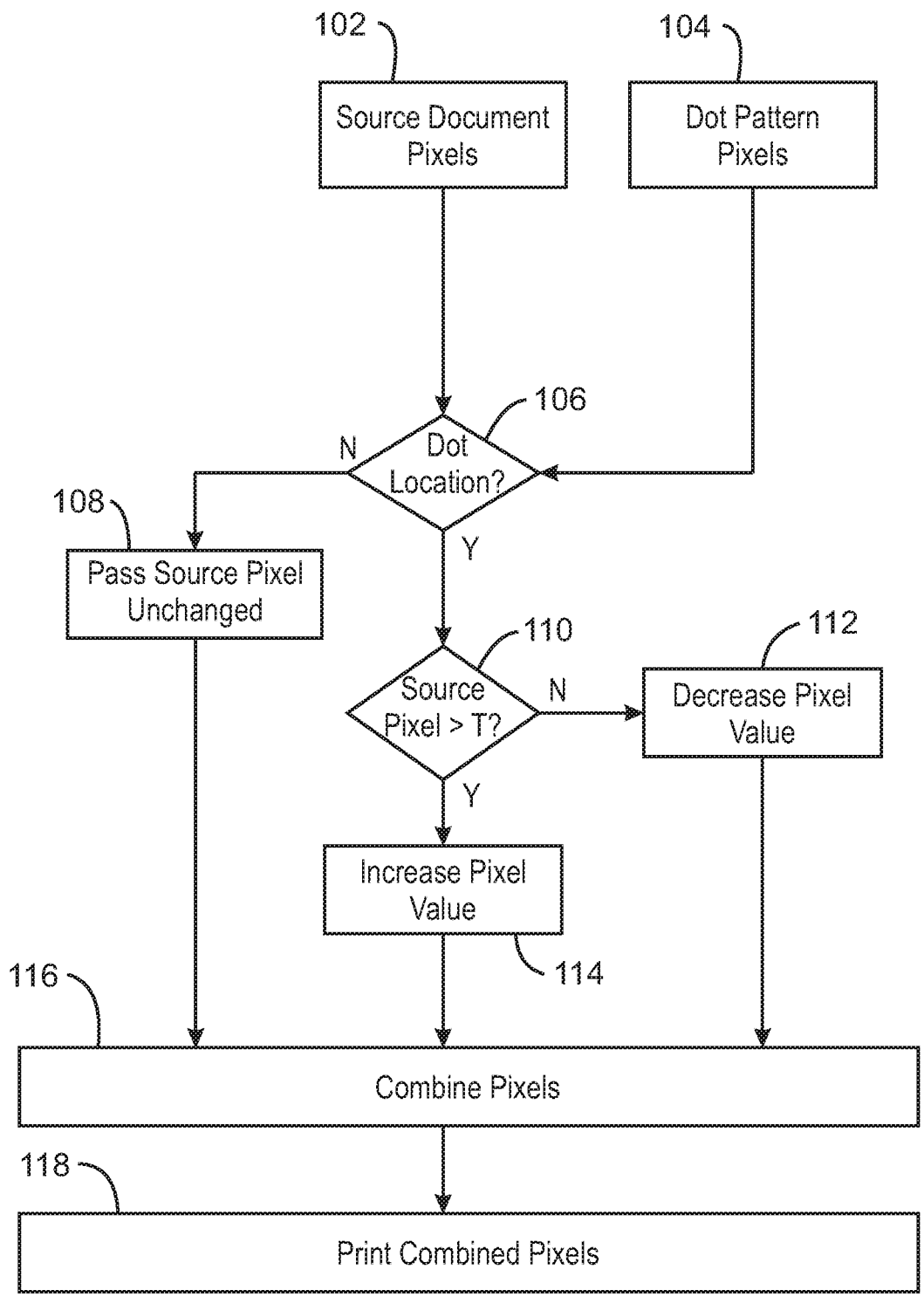
FIG. 1 is a schematic diagram illustrating an example method for encoding dot patterns into printed grayscale images based on source pixel intensity.

FIG. 1 is a schematic diagram illustrating an example method 100 for encoding dot patterns into printed images based on source pixel color. The method 100 of FIG. 1 may be implemented in the computing device 802 of FIG. 8 below or example machine-readable storage medium 900 of FIG. 9 below. For example, the method may be implemented using processor 802 or the processor 902.

The example method 100 includes receiving a set of source document pixels 102. For example, the set of source document pixels 102 may correspond to an image or a document. In some examples, the source document is a grayscale image of a single color and white or black and white.

The method 100 further includes receiving a dot pattern of pixels 104. For example, the dot pattern may be any pattern and may cover the width and length of the source document. The set of dot pattern pixels 108 may encode information. In some examples, the encoded information is information about a printer, a date, time of printing, etc.

At decision diamond 106, a determination is made as to whether each of the source page pixels corresponds to a dot location. For example, the location of the dots in the dot pattern may be compared one or more pixels at a time with the location of each of the pixels in the source document. The source page may be the same size in terms of number of pixels as the dot pattern. If a source page pixel does not correspond to a dot location, then the method 100 may continue at block 108. If the source page pixel does correspond to a dot location, then the method 100 may continue at block 110.

At block 108, a source pixel is passed unchanged in response to detecting that the source pixel does not correspond to a dot location in the dot pattern. The original intensity value of the source pixel may be passed for printing. For example, in the case of 8-bit pixel values, the intensity value of each pixel may range from 0 to 255. A source pixel with a value of 52 that does not correspond to any dot location may thus be passed with an original value of 52.

At decision diamond 110, a source pixel that is detected as corresponding to a dot location in the dot pattern is compared to a source pixel intensity threshold to determine if the intensity of the source pixel exceeds a source pixel intensity threshold. If the intensity value of the source pixel does not exceed the source pixel intensity threshold, then the method proceeds to block 112. At block 112, the value of the source pixel is decreased. For example, the value of the source pixel may be set to zero. A value of zero may correspond to solid black or any other solid printing color, such as cyan, magenta, or yellow.

If at block 110, the intensity value of the source pixel exceeds the source pixel intensity threshold, then the method may proceed to block 114. At block 114, the value of the source pixel is increased in response to detecting that the intensity of the source pixel does not exceed the source pixel intensity threshold. In some examples, the value of the source pixel may be set to a maximum value. For example, the maximum value may correspond to white.

Figure 4A:
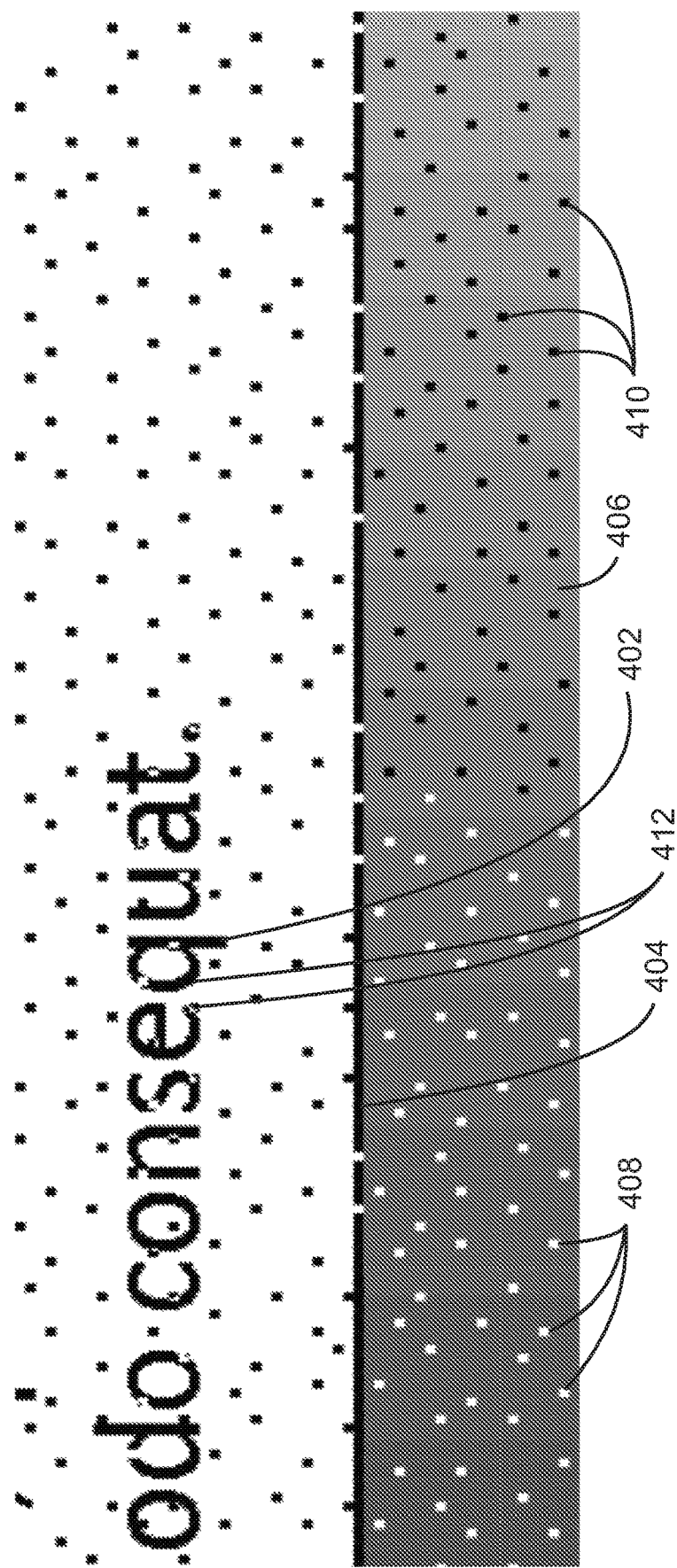
FIG. 4A is an example portion of a grayscale image with a dot pattern encoded using a 50% source pixel intensity threshold.
Figure 4C:
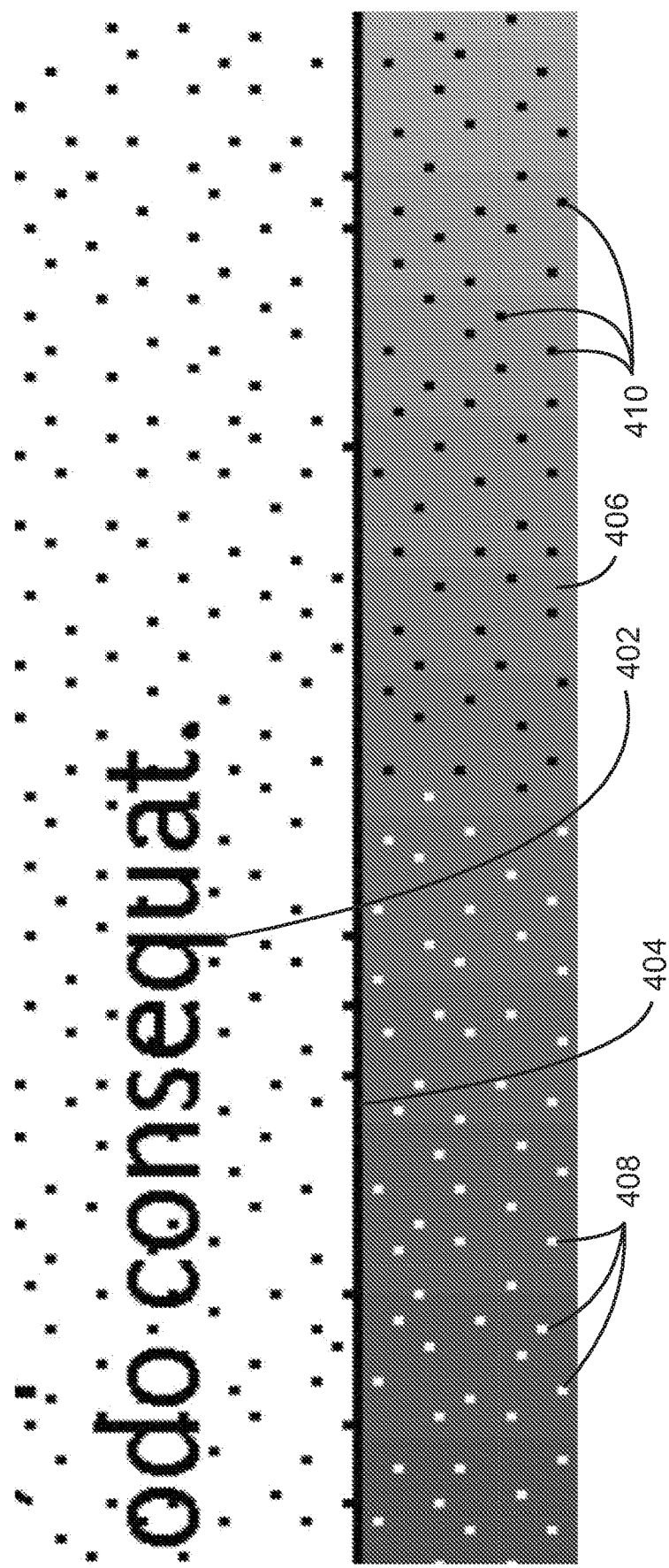
FIG. 4C is an example portion of the same grayscale image with a dot pattern encoded using a lookup table.

In some examples, the pixel intensity threshold may be set at 50% or an intensity value of 128. In some examples, the pixel intensity threshold may be set at 70% or an intensity value of 177. The output of the application of a gray clipping threshold of 50% is shown in FIGS. 4A and 4C and the output of a gray clipping threshold of 70% is shown in FIG. 4B below.

At block 116, the pixels from blocks 108, 114, and 112 are combined. For example, the pixels may be combined to form an updated image to be printed.

At block 118, the combined pixel values are printed. For example, the intensity values may be printed onto a white sheet of paper or any other suitable medium. Thus, the composite output that contains the original source pixels without dots, and the clipped value source pixels where there were dots, is printed It is to be understood that the process diagram of FIG. 1 is not intended to indicate that all of the elements of the method 100 are to be included in every case. Further, any number of additional elements not shown in FIG. 1 may be included in the method 100, depending on the details of the specific implementation. For example, a lookup table may also be used, as described with respect to FIG. 2 below.

Figure 2:
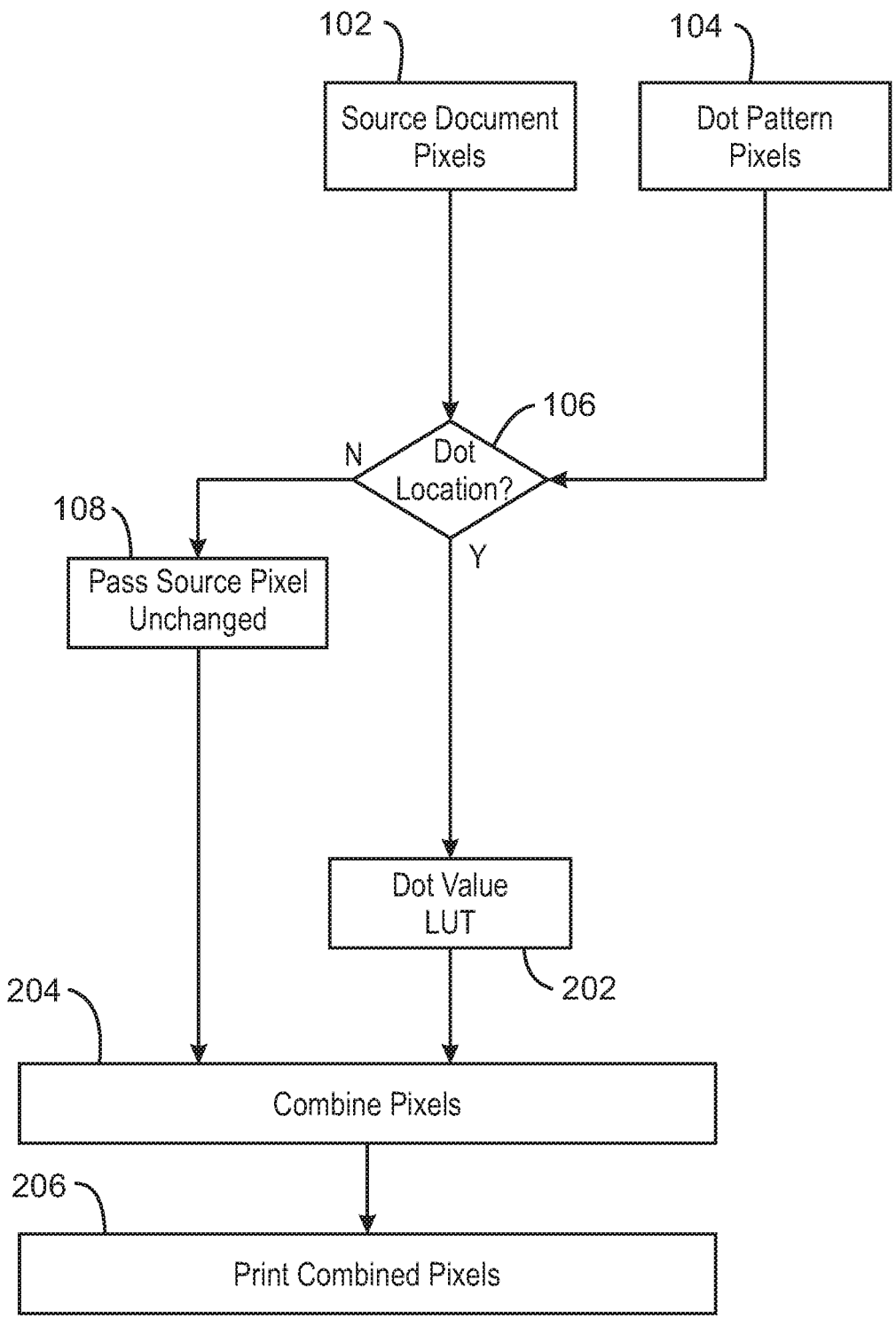
FIG. 2 is a schematic diagram illustrating an example method for encoding dot patterns into printed grayscale images using a lookup table.

FIG. 2 is a schematic diagram illustrating an example method 200 for encoding dot patterns using a lookup table. The example method 200 of FIG. 2 may be implemented in the computing device 802 of FIG. 8 below or example machine-readable storage medium 900 of FIG. 9 below. For example, the method 200 may be implemented using processor 802 or the processor 902.

The method 200 of FIG. 2 includes similarly numbered elements from FIG. 1. For example, the set of source page pixels 102 and dot pattern pixels 104 is received, a dot location determination 106 performed, and intensity values not in dot locations passed unchanged 108, as described above in FIG. 1. However, in the method 200 of FIG. 2, if the source page pixel is detected as corresponding to a dot location, then the method 100 may continue at block 202.

At block 202, an intensity value is set based on the intensity value of the source document pixels 102 corresponding to dot locations in the dot pattern. In an example, the lookup table has a column of all possible intensity values and corresponding replacement values. For example, the possible values may be 0-255, as shown in the example lookup table of FIG. 3 described in detail below. In some examples, the values are predefined based on the source pixel intensity threshold. Some of the values may not be based on the source pixel intensity threshold. For example, source pixels with a value of zero may be passed and not modified to avoid replacing portions of text or line drawings with dots. Placement of dots in the dot pattern into text or line drawings may reduce the readability or diminish the appearance of text or line drawings.

At block 204, the passed source pixel values and modified source pixel values are combined. For example, the pixel values may be combined to form an updated image to be printed.

Figure 5:
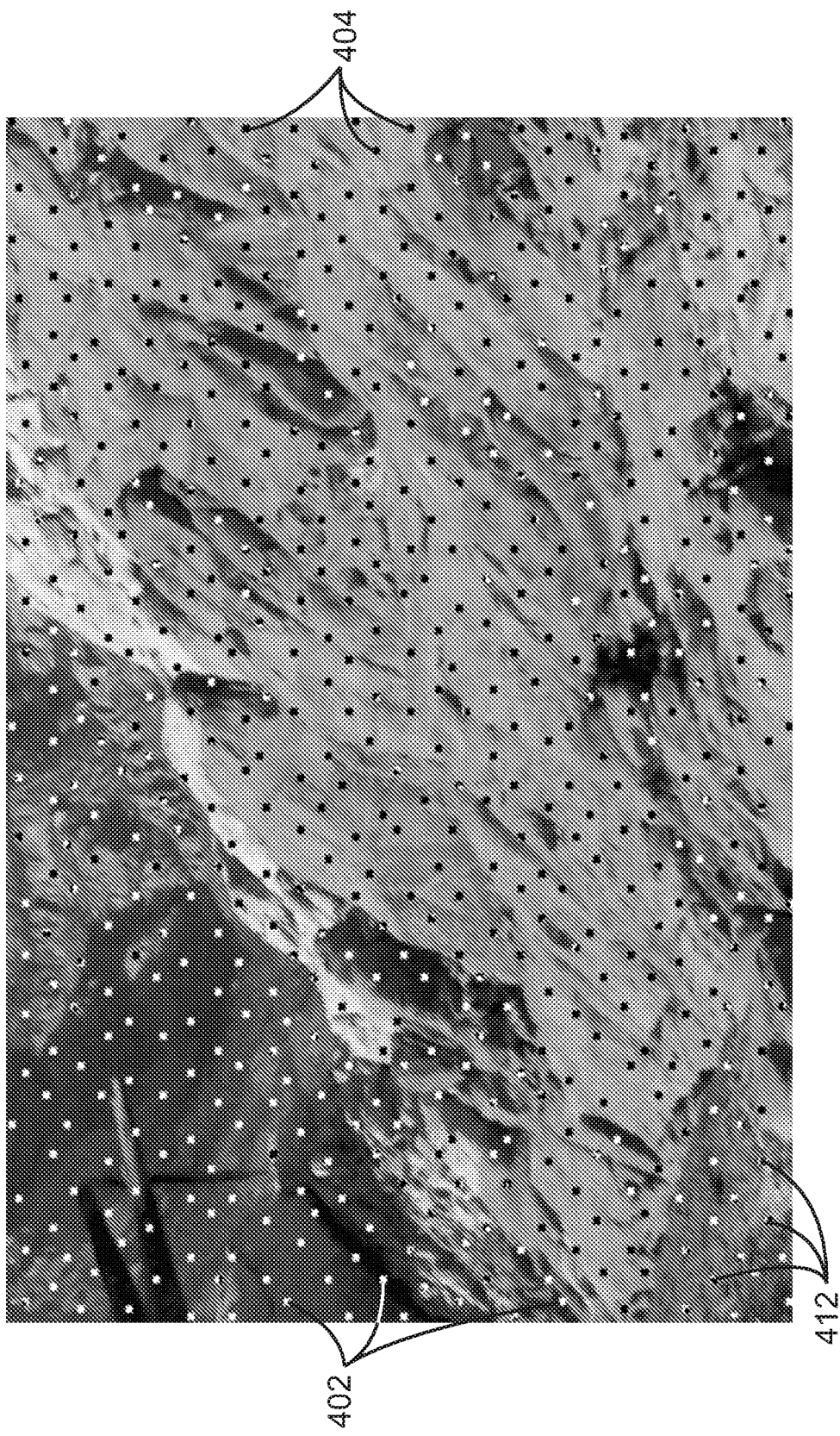
FIG. 5 is an example grayscale image encoded with a dot pattern based on source pixel intensity.

At block 206, the combined pixels are printed. For example, the original source pixel values not corresponding to any dots of the dot pattern, and replaced pixel values corresponding to dots in the dot pattern, may be printed. In some examples, the updated image with the combined pixels may be transmitted to a printer for printing. Along with documents containing text and areas of gray, the systems in FIGS. 1 and 2 can be applied to any content. An example cropped close-up of a grayscale photograph is shown in FIG. 5 below. The dot pattern can be detected regardless of the values of surrounding pixels.

Figure 3:
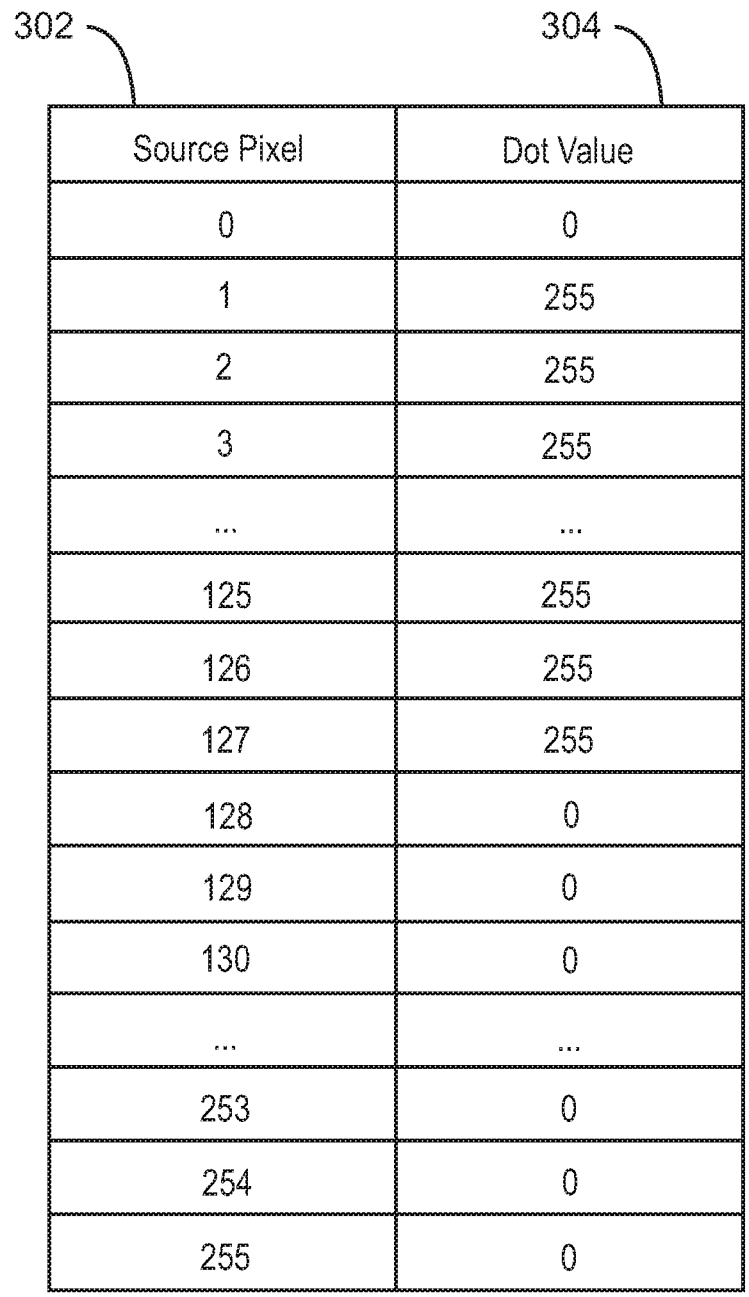
FIG. 3 is a chart of an example of a lookup table for selecting dot values based on source pixel intensity.

FIG. 3 is example of a lookup table for selecting dot values based on source pixel intensity. The example lookup table 300 of FIG. 3 may be used by the computing device 802 of FIG. 8 below or example machine-readable storage medium 900 of FIG. 9 below.

The lookup table 300 includes a set of source pixel intensity values 302. For 8-bit pixel values, the values range from 0 to 255 as shown in the table. In some examples, the source pixels use one color of CMYK process inks or RGB channel components rather than a combination of CMYK or RGB solid colors. The lookup table 300 further includes a corresponding column of dot values for the source pixel values. For example, a source pixel with a value of zero may be assigned a dot value of zero. As described above, this mapping may improve readability and appearance of text and line drawings using source pixels with a value of zero. Otherwise, in this example, source pixels with a value up to a threshold value of 127 may be set to a maximum value of 255. Thus, the threshold of the example table 300 of FIG. 3 is 50%. In some examples, the threshold is set to 70%. In these examples, the threshold for pixels with 8-bit values is 177. Source pixels with values exceeding the threshold value of 127 may be set to a minimum value of zero, representing black. Such source pixels may be lighter shades of gray or any other shades of solid colors. In some examples, the values in the range 0 to 255 may be mapped to a continuum of values in the same range, as opposed to setting the values to an extremum of 0 or 255.

Using the dot values 304 of FIG. 3, black text and black line drawings may avoid the visual disturbance of white holes due to the dot pattern. Meanwhile, white background and other gray values may still enjoy high contrast dot patterns. Generally, text and black lines occupy a small percentage of the document area, therefore the tradeoff may be a small loss of rendered dots for improved document visual appearance.

FIG. 4A is an example portion of a grayscale image with a dot pattern encoded using a 50% source pixel intensity threshold. The example grayscale image 400A of FIG. 4A may be generated by the computing device 802 of FIG. 8 below or using the example machine-readable storage medium 900 of FIG. 9 below.

As shown in FIG. 4A, the example grayscale image 400A includes black text 402 and a black line 404. The grayscale image 400A also includes a gray gradient 406 having pixel values ranging from 120 to 134. The grayscale image 400A includes clipped dots 408 with maximum values, referred to as white dots, and clipped dots 410 with values of zero representing black, referred to as black dots. The grayscale image 400A also includes mixed dots 412 with a mix of clipped values.

The example grayscale image 400A illustrates an example output using the methods of FIGS. 1 and 2 for a 50% source pixel intensity threshold. For the case of 8-bit pixel values, the intensity threshold value T may be $50\% \times 2^8 - 1 = 127$. In some examples, the threshold value may alternatively be implemented by replacing the condition "Source pixel>T?" with "Source pixel MSB=1 ?". Thus, the most significant bit (MSB) may be used in place of a threshold value. If the target printer is perfectly linear, where black pixels and white pixels appear the same size when rendered, the printed output would appear similar to the digital version in FIG. 4A.

FIG. 4B is example portion of the same grayscale image of FIG. 4A with a dot pattern encoded using a 70% source pixel intensity threshold. The example grayscale image 400B of FIG. 4B may be generated by the computing device 802 of FIG. 8 below or using example machine-readable storage medium 900 of FIG. 9 below.

As shown in FIG. 4B, the example grayscale image 400B includes similarly numbered elements from FIG. 4A above; however, FIG. 4B has less black dots 410 due to the use of a higher 70% source pixel intensity threshold. For example, for 8-bit pixel values, the source pixel intensity threshold value may be 177. In some examples, any other suitable source pixel intensity threshold values may be used.

In the example grayscale image 400B, none of the dots in the gray gradient 406 are black dots 410 because the threshold is higher than the value of any of the pixels of the gradient 406. For example, the highest pixel value shown in the gradient 406 may be 134, which is less than the threshold value of 177. Thus, only white dots 408 are seen in the gray gradient 406 of the grayscale image 400B. The use of a source pixel intensity threshold value of 70% may be used to offset the effects of printer dot gain. For example, black dots may appear larger than white dots due to ink bleeding of black ink on the print medium. Thus, because of printer dot gain, the phenomenon where black pixels are rendered larger than white pixels and thus shadow area appear disproportionately darker than highlight areas, a threshold larger than 50% can improve the contrast between dot values across all background values. Therefore, the captured versions of the print may have maximum contrast between dot and background for detection. In cases where printer dot gain is expected, the threshold value may accordingly be preset to a larger number than 50%, such as 70% as used in FIG. 4B.

FIG. 4C is portion of the same grayscale image with a dot pattern encoded using a lookup table. The example grayscale image 400C of FIG. 4C may be generated by the computing device 802 of FIG. 8 below or using example machine-readable storage medium 900 of FIG. 9 below. The grayscale image 400C may have been generated using the lookup table described in FIG. 3 above.

As shown in FIG. 4C, the example grayscale image 400C includes similarly numbered elements from FIG. 4A above.

However, in FIG. 4C, the text 402 and the line 404 do not include any dots of the dot pattern encoded into the grayscale image 400C.

The example grayscale image 400C may have been generated using the lookup table of FIG. 3 above. The output in the example of FIG. 4C is very similar to FIG. 4A, but the text and black lines are not broken up by the white holes of the dot pattern. In particular, for intensity values of zero, such as the text 402 and line 404, the resulting dot pixel value may also be zero according to the lookup table of FIG. 3. Thus, no dots appear in the text 402 or the line 404, resulting in text that is easier to read and a line that is not broken.

The dot pattern in FIGS. 4A-4C is just one example of the type of pattern that can be overlaid onto a document. The pattern can be generated from a clustered-dot halftone of a fixed gray level, with data represented by shifts of the dot clusters. In some examples, the spacing or density of the dots can be controlled by size of the halftone cells. The size of the dot can be controlled by the choice of the fix gray level that is halftoned.

FIG. 5 is an example grayscale image encoded with a dot pattern based on source pixel intensity. The example image 500 of FIG. 5 may be generated by the computing device 802 of FIG. 8 below or the example machine-readable storage medium 900 of FIG. 9 below using the methods 600 or 700 of FIGS. 6 and 7 below.

As shown in FIG. 5, the image 500 is a cropped close up view of mountains. The image 500 includes encoded white dots 402 with maximum values corresponding to white and black dots 404 with values of zero corresponding to black. The image 500 also includes encoded mixed dots 412 having a mix of pixel values depending on the underlying pixel values in the original image used to generate the image 500. In some examples, the image may have been encoded using either the grayscale clipping method 100 of FIG. 1 above and FIG. 6 below or the lookup table method of FIG. 2 above and FIG. 7 below. The image 500 may have been encoded using a 50% source pixel intensity threshold.

Figure 6:
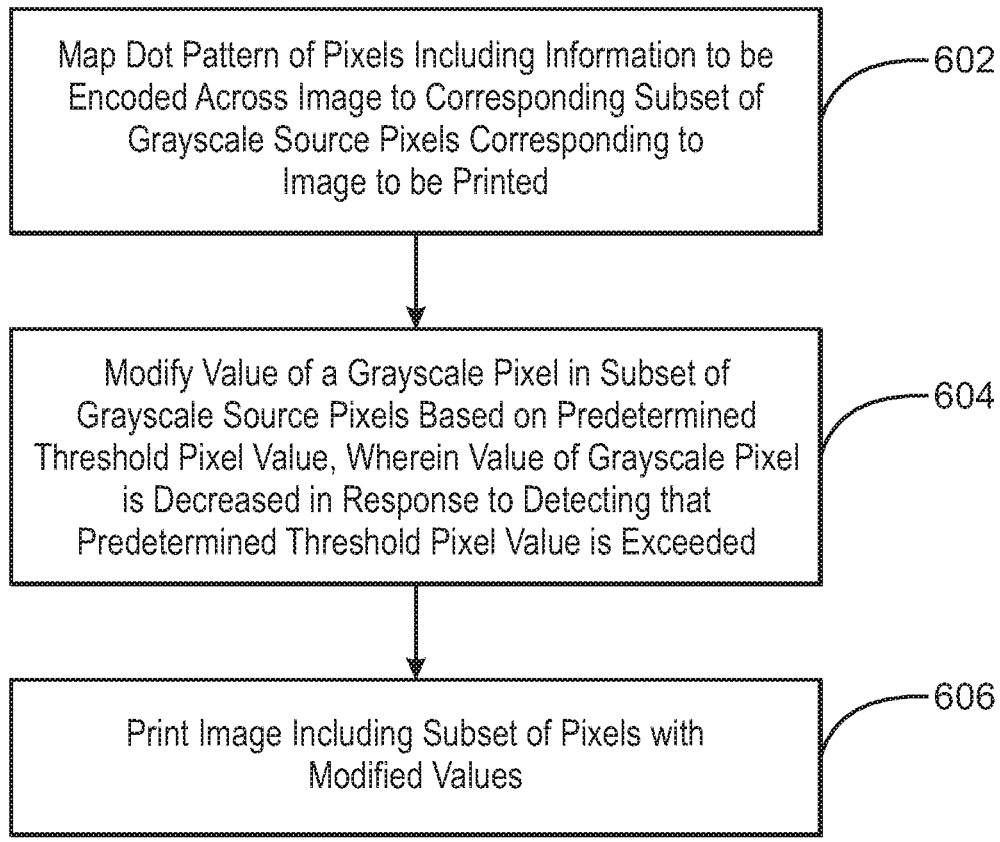
FIG. 6 is a process flow diagram illustrating an example method for encoding and printing images with dot patterns using grayscale clipping.

FIG. 6 is a process flow diagram illustrating an example method for encoding and printing images with dot patterns using grayscale clipping. The method 600 of FIG. 6 may be implemented in the computing device 802 of FIG. 8 below or example machine-readable storage medium 900 of FIG. 9 below. The method 1000 may be implemented using processor 802 or the processor 902.

At block 602, a dot pattern of pixels including information to be encoded across an image are mapped to a corresponding subset of grayscale source pixels corresponding to the image to be printed. A source page and a dot pattern image are compared one region at a time to match a corresponding subset of source pixels to the dot pattern of pixels. For example, the region may be a single pixel or grouping of pixels. The size of the dot pattern of pixels may be the same size as a source document page of the set of source pixels. In some examples, the grayscale source pixels may be shades of one color such as black, blue, red, magenta, cyan, yellow, etc.

At block 604, a value of a grayscale pixel in the subset of the grayscale source pixels is modified based on a predetermined threshold pixel value. For example, the value of the grayscale pixel may be decreased in response to detecting that the predetermined threshold pixel value is exceeded. In some examples, the value of the grayscale pixel may be decreased to a value of zero. In some examples, the value of the grayscale pixel is increased in response to detecting that the predetermined threshold pixel value is not exceeded. For example, the value of the grayscale may be increased to a maximum value. In some examples, the predetermined threshold pixel value may be greater than half of a highest pixel value to compensate for a printer dot gain.

At block 606, the image including the subset of pixels with modified values is printed. The image may be printed onto any suitable medium, such as a white sheet of paper. The dot pattern of pixels may then be detected in order to retrieve information encoded therein. Information from the detected dot pattern of pixels may then be extracted from the detected dot pattern.

It is to be understood that the process diagram of FIG. 6 is not intended to indicate that all of the elements of the method 600 are to be included in every case. Further, any number of additional elements not shown in FIG. 6 may be included in the method 600, depending on the details of the specific implementation. For example, a set of color pixels may be received and a color channel from the color pixels may be selected to obtain the grayscale source pixels.

Figure 7:
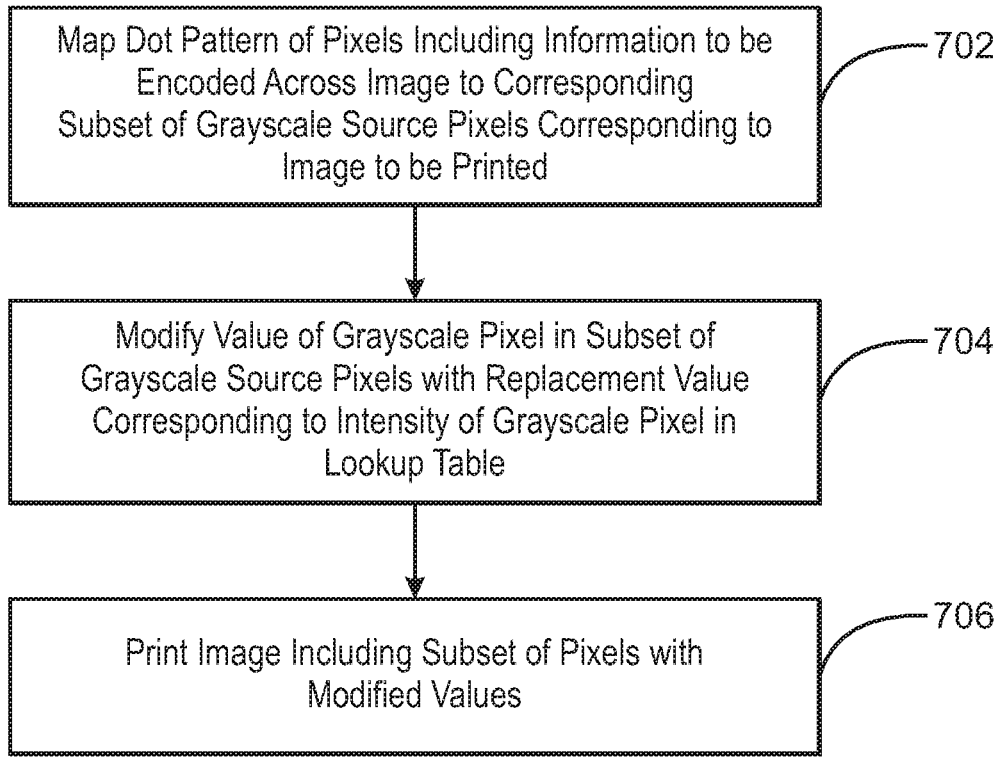
FIG. 7 is a process flow diagram illustrating an example method for encoding and printing grayscale images with dot patterns using a lookup table.

FIG. 7 is a process flow diagram illustrating an example method for encoding and printing grayscale images with dot patterns using a lookup table. The method of FIG. 7 is generally referred to by the reference number 700 and may be implemented in the computing device 802 of FIG. 8 below or example machine-readable storage medium 900 of FIG. 9 below. The method may be implemented using processor 802 or the processor 902.

At block 702, a set of source pixels corresponding to an image to be printed is received and a dot patter of pixels including information to be encoded across the image. The image may be a grayscale image or a document containing both black text and grayscale images. In some examples, the information includes printer information, a date, time, who printed it, a transaction code, a document identifier, network statistics, user-driven measurements, among other information. Alternatively, or in addition, the stored data in the dot pattern can be a linked to a database pointing to this information.

At block 702, the dot pattern of pixels is mapped to a corresponding subset of grayscale source pixels. For example, a source page and a dot pattern image may be compared one region at a time to match a corresponding subset of source pixels to the dot pattern of pixels. For example, the region may be a pixel or a grouping of pixels.

At block 704, a value of a grayscale pixel in the subset of grayscale source pixels is modified with a replacement value corresponding to an intensity of a grayscale pixel in a lookup table. In some examples, the value of the grayscale pixel is set to a maximum value or any other increased value as found in the lookup table for grayscale pixel values not exceeding a threshold value. In these examples, the value of the grayscale pixel is set to zero or any other decreased value as found in the lookup table for grayscale pixel values exceeding the threshold value. In some examples, one or more of the grayscale pixel values in the lookup table are set to a custom value. For example, the value of zero may be set to be replaced with the same value of zero and thus not modified. Thus, line drawings and text using grayscale pixel values of zero may not include any dot patterns in order to prevent breaking up continuous lines. The line drawings and text may therefore be more easily read. In some examples, the grayscale pixel values may be mapped to a continuum of values in the range 0 to 255. For example, the grayscale pixel values may be mapped without definitions of any explicit (hard) thresholds.

At block 706, the image including the subset of pixels with modified values is printed. The image may be printed onto any suitable medium, such as a white sheet of paper. The dot pattern of pixels may then be detected in order to retrieve information encoded therein. Information from the detected dot pattern of pixels may be extracted from the detected dot pattern. The information may thus be encoded and extracted using the dot patterns without affecting the readability of line drawings or text within the printed grayscale image.

It is to be understood that the process diagram of FIG. 7 is not intended to indicate that all of the elements of the method 700 are to be included in every case. Further, any number of additional elements not shown in FIG. 7 may be included in the method 700, depending on the details of the specific implementation. For example, a set of color pixels may be received and a color channel from the color pixels may be selected to obtain the grayscale source pixels.

Figure 8:
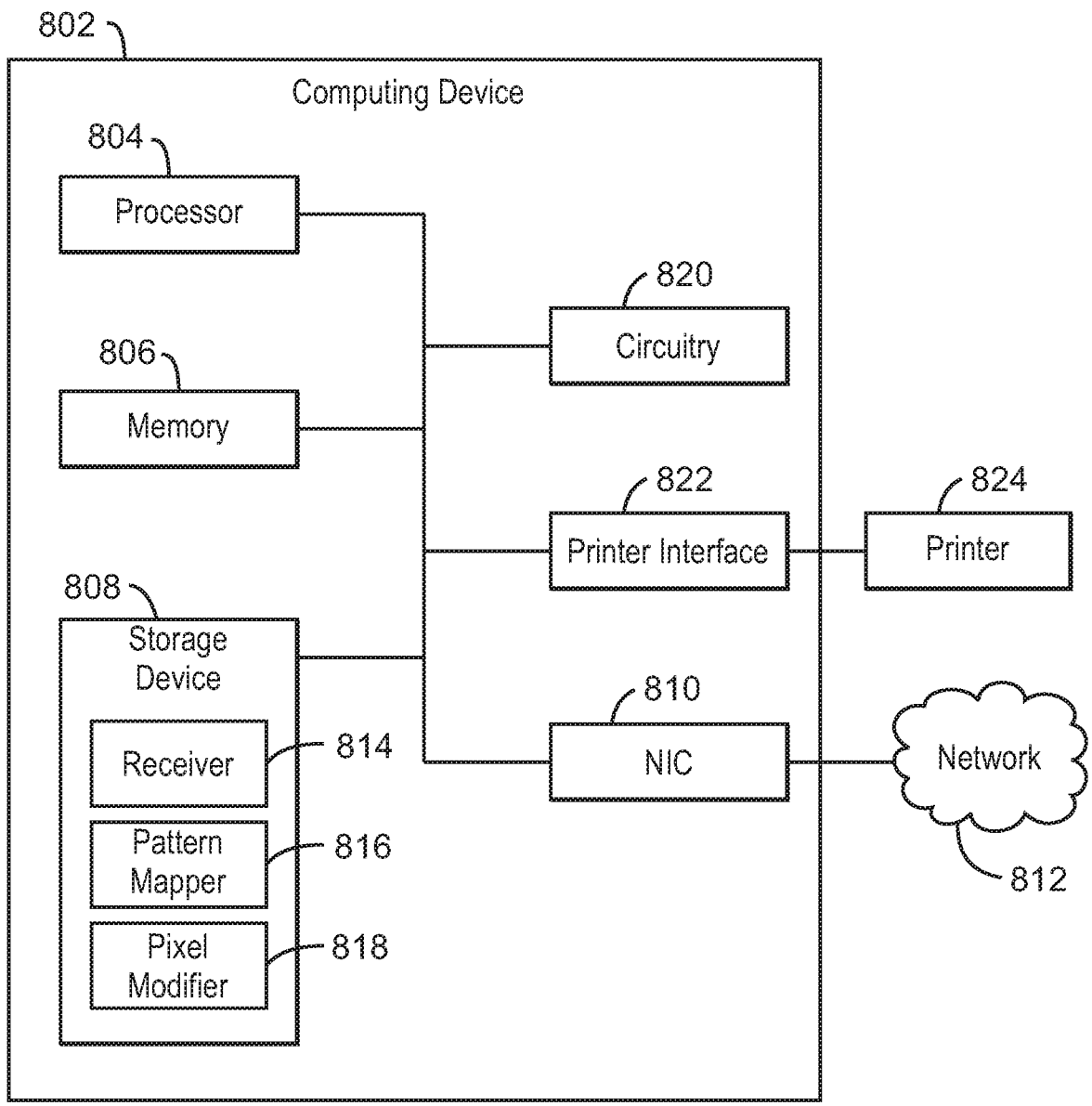
FIG. 8 is block diagram of an example computing device to modify and print images with encoded dot patterns based on source pixel intensity.

FIG. 8 is a block diagram of an example computing device 802 to modify and print images with encoded dot patterns based on source pixel color. The computing device 802 may be a printing device. The computing device 802 may include a processor 804, memory 806, a machine-readable storage 808, and a network interface 810 to connect computing system 802 to network 812. The network interface 810 may be a network interface card (NIC).

In some examples, the processor 804 may be a main processor that is adapted to execute the stored instructions. Moreover, more than one processor 804 may be employed. The processor 804 may be a single core processor, a multi-core processor, a computing cluster, or any number of other configurations. The processor 804 may be implemented as Complex Instruction Set Computer (CISC) or Reduced Instruction Set Computer (RISC) processors, x86 Instruction set compatible processors, ARMv7 Instruction set compatible processors, multi-core, or any other microprocessor or central processing unit (CPU). In some examples, the computing device 800 may use an ASIC, FPGA or GPU to process video images instead of, or in addition to, the processor 804.

The memory 806 may be one or more memory devices. The memory 806 may be volatile memory or nonvolatile memory. In some examples, the memory 806 may include random access memory (RAM), cache, read only memory (ROM), flash memory, and other memory systems.

The storage 808 is machine-readable storage and may include volatile and nonvolatile memory. The machine-readable storage 808 may be electronic, magnetic, optical, or other physical storage device that stores executable instructions (e.g., code, logic). Thus, the machine-readable storage 808 medium may be, for example, RAM, an Electrically-Erasable Programmable Read-Only Memory (EEPROM), a storage drive such as a hard drive or solid state drive (SSD), an optical disc, and the like. The storage 808 may also include storage or memory external to the computing device 802. Moreover, as described below, the machine-readable storage medium 808 may be encoded with executable instructions (e.g., executed by the one or more processors 804) for prioritizing data. For example, the machine-readable storage medium 808 may be encoded with executable instructions for modifying and printing images with encoded dot patterns based on source pixel color.

A network interface controller (NIC) 810 may couple the computing system 802 to a network 812. For example, the NIC 810 may connect computing system 802 to a local network 812, a virtual private network (VPN), or the Internet. The NIC 810 may include an Ethernet controller. In some examples, the network includes a database (not shown). For example, the database may include information to be encoded as dot patterns.

The storage device 808 may include a receiver 814, a pattern mapper 816, a pixel modifier 818, and a printer 820. The receiver 814 may receive a set of grayscale source pixels corresponding to an image to be printed and a dot pattern of pixels including information to be encoded across the image. The pattern mapper 816 may map the dot pattern of pixels to a corresponding subset of the grayscale source pixels. The pixel modifier 818 may modify a value of a grayscale pixel in the subset of the grayscale source pixels based on a predetermined threshold pixel value. The predetermined threshold pixel value may be greater than half of a highest pixel value to compensate for a printer dot gain. In some examples, pixel modifier 818 may set the value of the grayscale pixel to zero in response to detecting that the predetermined threshold pixel value is exceeded. In some examples, the pixel modifier 818 may increase the value of the grayscale pixel in response to detecting that the predetermined threshold pixel value is not exceeded. For example, the value of the grayscale pixel may be increase to a maximum pixel value. In some examples, the pixel modifier 818 may pass the value of a second grayscale pixel corresponding to the subset of grayscale source pixels without modification in response to detecting that the value of the grayscale source pixel is zero. In some examples, a lookup table to be used by the pixel modifier 818 to determine a replacement value for the grayscale pixel. For example, the lookup table may be generated at least in part based on the predetermined threshold pixel value and stored on the storage device 808 as described above. In some examples, one or more of the values in the lookup table may be modifiable. For example, the value of zero may be kept at zero to pass pixels that are part of text or line drawings without modification. In some examples, the grayscale pixel values may be mapped to a continuum of output values. For example, there may be no explicit (hard) threshold pixel values.

The receiver 814, pattern mapper 816, and pixel modifier 818 may be instructions (e.g., code, logic, etc.) stored in the machine-readable storage 808 and executed by the processor 804 or other processor to direct the computing device 800 to implement the aforementioned actions as described above.

The storage 808 may also include generated lookup tables used to select replacement values for dot patterns. The storage 808 may also further include one or more dot patterns to be encoded into printed grayscale documents.

The computing device 802 may also include circuitry 820. In some examples, the receiver 814, pattern mapper 816, and pixel modifier 818 may be implemented in the circuitry 820. For example, the circuitry 820 may include application-specific integrated circuits (ASICs). In other words, one or more ASICs may be customized for the aforementioned actions implemented via the receiver 814, pattern mapper 816, and pixel modifier 818. In some examples, the circuitry 820 may include one or more field-programmable gate arrays (FPGAs).

The computing device 802 may include a printer interface 822 connecting the computing device 802 to a printer 824. In some examples, the printer interface 822 may be built into the printer 824. The printer 824 may print images including the subset of pixels with modified values.

The block diagram of FIG. 8 is not intended to indicate that the computing device 802 is to include all of the components shown in FIG. 8. Further, the computing device 802 may include any number of additional components not shown in FIG. 8, depending on the details of the specific implementation.

Figure 9:
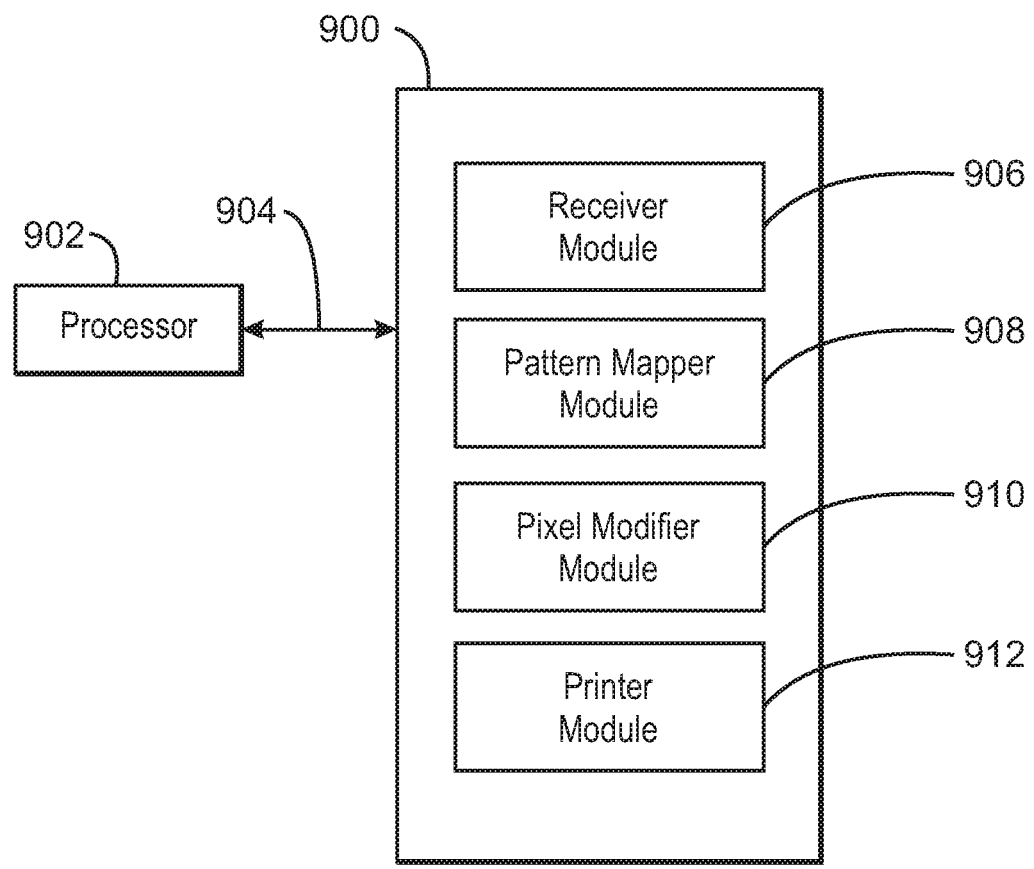
FIG. 9 is a block diagram of an example machine-readable storage medium that can be used to modify and print images with encoded dot patterns based on source pixel intensity.

FIG. 9 is a block diagram of an example machine-readable storage medium that can be used to modify and print images with encoded dot patterns based on source pixel color. The machine-readable medium is generally referred to by the reference number 900. The machine-readable medium 900 may include RAM, a hard disk drive, an array of hard disk drives, an optical drive, an array of optical drives, a non-volatile memory, a flash drive, a digital versatile disk (DVD), or a compact disk (CD), among others. The machine-readable storage medium 900 may be accessed by a processor 902 over a bus 904. The processor 902 may be a processor of a computing device, such as the processor 804 of FIG. 8. In some examples, the processor 902 may be a graphics processing unit (GPU). Furthermore, as indicated, the machine-readable medium 900 may include code configured to perform the methods and techniques described herein. The various logic components discussed herein may be stored on the machine-readable medium 900. Portions 906, 908, 910, and 912 of the machine-readable storage medium 900 may include receiver module code, pattern mapper module code, pixel modifier module code, and printer module code, respectively, which may be executable code, or machine readable instructions, that direct a processor or controller in performing the techniques discussed with respect to the preceding figures.

The various logic (e.g., instructions, code) components discussed herein may be stored on the tangible, non-transitory machine-readable medium 900 as indicated in FIG. 9. For example, the machine-readable medium 900 may include the receiver module 906 that, when executed by a processor, directs the processor or a computing device to receive a set of grayscale source pixels corresponding to an image to be printed and a dot pattern of pixels including information to be encoded across the image.

The machine-readable medium 900 may also include the pattern mapper module 908 that, when executed by a processor, directs the processor or a computing device to map the dot pattern of pixels to a corresponding subset of the grayscale source pixels. The machine-readable medium 900 may include the pixel modifier module 910 that, when executed by a processor, directs the processor or a computing device to modify a value of a grayscale pixel in the subset of the grayscale source pixels based on a predetermined threshold pixel value. The value of the grayscale pixel is to be decreased in response to detecting that the predetermined threshold pixel value is exceeded. For example, the value of the grayscale pixel may be decreased to zero.

The pixel modifier module 910 may also direct the processor or a computing device to increase the value of the grayscale pixel in response to detecting that the predetermined threshold pixel value is not exceeded. For example, the value of the grayscale pixel may be increased to a maximum value. The pixel modifier module 910 may also direct the processor or a computing device to set the predetermined threshold pixel value greater than half of a highest pixel value to compensate for a printer dot gain. The pixel modifier module 910 may also direct the processor or a computing device to pass a value of a second grayscale pixel corresponding to the subset of grayscale source pixels in response to detecting that the value of the grayscale source pixel is zero.

The pixel modifier module 910 may also direct the processor or a computing device to use a lookup table to determine a replacement value for the grayscale pixel. For example, the lookup table may include one or more replacement values for the pixels that are based on the predetermined threshold pixel values. In some examples, the lookup table may include customized values for particular pixel values. For example, the pixel value of zero representing black may be set to be replaced with black to improve readability of text and line drawings. The machine-readable medium 900 may include a printer module 912 that, when executed by a processor, direct the processor or a computing device to print the image including the subset of pixels with modified values. In some examples, the machine-readable medium 900 may include a dot detector module (not shown) that, when executed by a processor, directs the processor or a computing device to receive a copy of the printed image, detect the dot patter of pixels, and extract information from the detected dot pattern of pixels. Although shown as contiguous blocks, the logic components may be stored in any order or configuration. For example, if the machine-readable medium 900 is a hard drive, the logic components may be stored in non-contiguous, or even overlapping, sectors.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method comprising:
    mapping a dot pattern of pixels comprising information to be encoded across an image to a corresponding subset of grayscale source pixels corresponding to the image;
    modifying a value of a grayscale pixel in the subset of the grayscale source pixels based on a predetermined threshold pixel value, wherein the value of the grayscale pixel is decreased in response to detecting that the predetermined threshold pixel value is exceeded; and
    printing the image comprising the subset of pixels with modified values.

2. The method of claim 1, wherein the predetermined threshold pixel value is greater than half of a highest pixel value to compensate for a printer dot gain.

3. The method of claim 1, wherein the value of the grayscale pixel is increased in response to detecting that the predetermined threshold pixel value is not exceeded.

4. The method of claim 1, comprising passing a value of a second grayscale pixel corresponding to the subset of grayscale source pixels without modification in response to detecting that the value of the grayscale source pixel is zero.

5. The method of claim 1, wherein modifying the value of the grayscale pixel comprises using a lookup table to determine a replacement value for the grayscale pixel.

6. An apparatus comprising:
    a receiver to receive a set of grayscale source pixels corresponding to an image to be printed and a dot pattern of pixels comprising information to be encoded across the image;
    a pattern mapper to map the dot pattern of pixels to a corresponding subset of the grayscale source pixels;
    a pixel modifier to modify a value of a grayscale pixel in the subset of the grayscale source pixels based on a predetermined threshold pixel value, wherein the value of the grayscale pixel is to be decreased in response to detecting that the predetermined threshold pixel value is exceeded; and
    a printer to print the image comprising the subset of pixels with modified values.

7. The apparatus of claim 6, wherein the predetermined threshold pixel value is greater than half of a highest pixel value to compensate for a printer dot gain.

8. The apparatus of claim 6, wherein the pixel modifier is to increase the value of the grayscale pixel in response to detecting that the predetermined threshold pixel value is not exceeded.

9. The apparatus of claim 6, wherein the pixel modifier is to pass the value of a second grayscale pixel corresponding to the subset of grayscale source pixels without modification in response to detecting that the value of the grayscale source pixel is zero.

10. The apparatus of claim 6, comprising a lookup table to be used to determine a replacement value for the grayscale pixel.

11. A non-transitory machine-readable storage medium encoded with instructions executable by a processor, the machine-readable storage medium comprising instructions to direct the processor to:
    receive a set of grayscale source pixels corresponding to an image to be printed and a dot pattern of pixels comprising information to be encoded across the image;
    map the dot pattern of pixels to a corresponding subset of the grayscale source pixels;
    modify a value of a grayscale pixel in the subset of the grayscale source pixels based on a predetermined threshold pixel value, wherein the value of the grayscale pixel is to be decreased in response to detecting that the predetermined threshold pixel value is exceeded; and
    print the image comprising the subset of pixels with modified values.

12. The non-transitory machine-readable storage medium of claim 11, comprising instructions to direct the processor to set the predetermined threshold pixel value greater than half of a highest pixel value to compensate for a printer dot gain.

13. The non-transitory machine-readable storage medium of claim 11, comprising instructions to direct the processor to increase the value of the grayscale pixel in response to detecting that the predetermined threshold pixel value is not exceeded.

14. The non-transitory machine-readable storage medium of claim 11, comprising instructions to direct the processor to pass a value of a second grayscale pixel corresponding to the subset of grayscale source pixels in response to detecting that the value of the grayscale source pixel is zero.

15. The non-transitory machine-readable storage medium of claim 11, further comprising instructions to direct the processor to use a lookup table to determine a replacement value for the grayscale pixel.

\* \* \* \* \*